US008836680B2

(12) United States Patent
Zebedee

(10) Patent No.: US 8,836,680 B2
(45) Date of Patent: Sep. 16, 2014

(54) DISPLAY DEVICE FOR ACTIVE STORAGE PIXEL INVERSION AND METHOD OF DRIVING THE SAME

(75) Inventor: Patrick Zebedee, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 534 days.

(21) Appl. No.: 13/198,351

(22) Filed: Aug. 4, 2011

(65) Prior Publication Data

US 2013/0033473 A1 Feb. 7, 2013

(51) Int. Cl.

*G06F 3/038* (2013.01)
*G09G 5/00* (2006.01)
*G09G 3/36* (2006.01)

(52) U.S. Cl.

CPC ............ *G09G 3/3614* (2013.01); *G09G 3/3655* (2013.01); *G09G 2300/0823* (2013.01); *G09G 2300/0861* (2013.01); *G09G 2230/00* (2013.01); *G09G 2300/0426* (2013.01)

USPC ............................................ 345/209; 345/96

(58) Field of Classification Search

USPC .................................................. 345/209, 96

See application file for complete search history.

(56) References Cited

U.S. PATENT DOCUMENTS

| | | | | |
|---|---|---|---|---|
| 5,296,847 | A | 3/1994 | Takeda | |
| 5,581,273 | A * | 12/1996 | Yoneda et al. | 345/90 |
| 6,064,362 | A | 5/2000 | Brownlow | |
| 6,278,426 | B1 * | 8/2001 | Akiyama | 345/87 |
| 6,897,843 | B2 | 5/2005 | Ayres | |
| 6,940,483 | B2 | 9/2005 | Maeda | |
| 7,573,451 | B2 * | 8/2009 | Tobita | 345/90 |
| 8,289,246 | B2 * | 10/2012 | Ohhashi et al. | 345/82 |
| 8,390,552 | B2 * | 3/2013 | Miyashita | 345/90 |
| 8,427,206 | B2 * | 4/2013 | Yamamoto et al. | 327/108 |

(Continued)

FOREIGN PATENT DOCUMENTS

| | | |
|---|---|---|
| JP | 5-142573 | 11/1991 |
| JP | 2003-108056 A | 4/2003 |

(Continued)

OTHER PUBLICATIONS

Y. Asaoka et al., "Polarizer-free Reflective LCD Combined with Ultra Low-power Driving Technology", SID 09 Digest, pp. 395-398 (cited on p. 3, line 12 of the specification; previously listed on IDS submitted on Aug. 4, 2011 with application).

(Continued)

*Primary Examiner* — Alexander S Beck
*Assistant Examiner* — Sejoon Ahn
(74) *Attorney, Agent, or Firm* — Renner, Otto, Boisselle & Sklar, LLP

(57) ABSTRACT

A pixel circuit is disclosed that includes a video mode, a memory mode and an inversion mode of operation. The pixel circuit includes a pixel storage node for storing data to be output by a liquid crystal cell, a pixel write circuit configured to receive display data and provide the display data to the pixel storage node for storage thereon. Further, the pixel circuit includes a hold circuit operatively coupled to the pixel write circuit and configured to minimize leakage of charge from the pixel storage node through the pixel write circuit, and an internal inversion circuit operatively coupled to the hold circuit and the pixel storage node and configured to invert a voltage of the data stored on the pixel storage node and a voltage applied to a liquid crystal cell that receives data stored on the pixel storage node.

20 Claims, 7 Drawing Sheets

(56) References Cited

U.S. PATENT DOCUMENTS

| | | | | |
|---|---|---|---|---|
| 2002/0180675 | A1* | 12/2002 | Tobita et al. | 345/87 |
| 2003/0122747 | A1* | 7/2003 | Shannon et al. | 345/76 |
| 2003/0122773 | A1* | 7/2003 | Washio et al. | 345/103 |
| 2004/0041760 | A1* | 3/2004 | Tsumura et al. | 345/87 |
| 2004/0113879 | A1* | 6/2004 | Sekiguchi et al. | 345/94 |
| 2005/0030276 | A1* | 2/2005 | Murakami et al. | 345/102 |
| 2005/0099375 | A1 | 5/2005 | Moriyama et al. | |
| 2006/0164344 | A1* | 7/2006 | Fish | 345/76 |
| 2006/0232577 | A1 | 10/2006 | Edwards et al. | |
| 2007/0024606 | A1 | 2/2007 | Moriyama et al. | |
| 2007/0182689 | A1 | 8/2007 | Miyazawa | |
| 2008/0024481 | A1* | 1/2008 | Lee et al. | 345/212 |
| 2009/0002582 | A1 | 1/2009 | Sano | |
| 2009/0219238 | A1* | 9/2009 | Furuya et al. | 345/87 |
| 2010/0033458 | A1* | 2/2010 | Shimizu et al. | 345/211 |
| 2010/0149080 | A1 | 6/2010 | Teranishi et al. | |
| 2012/0075251 | A1* | 3/2012 | Yamauchi | 345/174 |
| 2012/0176388 | A1* | 7/2012 | Yokoyama et al. | 345/531 |
| 2012/0218252 | A1* | 8/2012 | Yamauchi | 345/212 |

FOREIGN PATENT DOCUMENTS

| | | | |
|---|---|---|---|
| JP | 2007-502068 | A | 2/2007 |
| JP | 2010/145663 | A | 7/2010 |
| WO | 2011/055572 | A1 | 5/2011 |
| WO | WO 2011055572 | A1 * | 5/2011 |

OTHER PUBLICATIONS

Y. Asaoka et al., "Polarizer-free Reflective LCD Combined with Ultra Low-power Driving Technology", Informational Document, LCD Products, Oct. 2010.

Y. Asaoka et al., "Polarizer-free Reflective LCD Combined with Ultra Low-power Driving Technology", SID 09 Digest, pp. 395-398 (cited on p. 3, line 12 of the specification).

International Search Report for International Application No. PCT/JP2012/070406 dated Oct. 23, 2012.

* cited by examiner

Figure 1: Conventional Art

DISPLAY DEVICE FOR ACTIVE STORAGE PIXEL INVERSION AND METHOD OF DRIVING THE SAME

TECHNICAL FIELD

The invention relates to an active-matrix display device, and more particularly, to an active-matrix display device with very low update rate, wherein pixels of the display device include a means for holding data for an extended period. Further, the invention relates to a method of driving such a display device.

BACKGROUND ART

A typical active matrix liquid crystal display (LCD) includes an array of pixels such as the one shown in FIG. 1. Each pixel includes two transistors 8 and 10, a storage capacitor 16 and a liquid crystal (LC) cell 14. To write a data voltage to the pixel, the GL input is raised to a high state and a data voltage is driven on the SL input. The data voltage passes into the pixel via transistors 8 and 10, and is subsequently held on the pixel storage node 12 when the GL input is set to a low state. The voltage held on the pixel storage node is referred to as the pixel voltage, and controls the state of the LC cell and therefore the brightness of the pixel.

Such pixels, however, are not perfect: the transistors 8 and 10 exhibit a leakage current when in the off state. This leakage current results in a degradation of the pixel voltage over time. To address this problem, the display data is rewritten to the pixel to minimise image deterioration during the hold time. A frame refresh rate of 60 Hz is typical. This constant refreshing of the display results in significant power consumption, in particular because the column electrodes connecting the data to the SL input of each pixel must be repeatedly charged. One approach to reducing this power consumption is to reduce the frame refresh rate. Frame rate reduction is only possible if the degradation of the pixel electrode voltage is reduced. The pixel voltage degradation can be reduced by either increasing the size of the storage capacitor or reducing the leakage current. A larger storage capacitor is not desirable since it would result in increased pixel area and would increase the time taken to charge the pixel during data writing. Thus, the preferred approach to reducing the frame refresh rate is to reduce the leakage current.

Japanese laid-open patent application No. 5-142573 (Sato, Nov. 22, 1991) and U.S. Pat. No. 6,064,362 (Brownlow, May 16, 2000) and U.S. Pat. No. 7,573,451 (Tobita, Aug. 11, 2009) disclose different implementations of a technique to reduce the deterioration of the pixel voltage. This technique involves "boot strapping": a unity gain voltage gain amplifier has its input connected to the pixel storage node 12 and its output connected to the junction between transistors 8 and 10, causing the pixel electrode voltage to appear at the junction of the series connected transistors 8 and 10. If the buffer amplifier were ideal and drew no charge from the pixel storage node 12, leakage from the pixel storage node 12 would be eliminated since the drain to source voltage of transistor 10 would be reduced to zero volts.

In the case of an LCD, the polarity of the voltage across the liquid crystal 14 must be inverted periodically. This prevents degradation of the LC material. In a 60 Hz display, the data driver typically inverts the voltage for each pixel each time it is written. Inversion may be implemented either by keeping the common electrode voltage, VCOM, constant and changing the voltage written to the pixel storage node (known as dc VCOM drive), or by changing the voltage applied to VCOM and changing the voltage written to the pixel storage node by a smaller amount (ac VCOM drive). In either case, the potential difference between the pixel storage node and VCOM should be the same absolute value but opposite polarity on alternate inversion cycles.

It is desirable to perform inversion of the LC voltage inside the pixels. To invert the data from the driver requires the column electrodes to be charged as well as the pixel capacitance. This consumes more power than in-pixel inversion, so it is undesirable in a battery-powered system.

None of the preceding prior art discloses a means for inverting the stored data inside the pixels. Instead, the data driver must write new, inverted data at an appropriate rate to prevent LC degradation.

U.S. Pat. No. 6,897,843 (Ayres, May 24, 2005) and US patent applications 2009/0002582A1 (Sano, Jan. 1, 2009) and 2007/0182689A1 (Miyazawa, Aug. 9, 2007) disclose pixel circuits that can perform inversion of the stored data without new data being written from the driver circuit. The inversion operation also serves to refresh the pixel voltage. Neither circuit includes any means for preventing degradation of the pixel voltage between inversion operations. The inversion frequency is therefore set by the pixel leakage current, and cannot be reduced to reduce the power consumed by the pixels.

"Polarizer-free Reflective LCD Combined with Ultra Low-power Driving Technology", Y. Asaoka et al., SID 09 Digest pp 395-8 (conference held May 31-Jun. 5, 2009), and U.S. Pat. No. 6,940,483 (Maeda, Sep. 6, 2005) both describe pixel circuits with separate memory and inversion parts. The memory part is formed from SRAM (static random access memory), a well-known type of electronic memory that does not suffer from leakage. As in US patent application 2007/0182689A1 (Miyazawa, Aug. 9, 2007), the LC voltage is inverted without inverting the stored data. An advantage of this circuit is that the stored data is held indefinitely without leakage, so the inversion rate can be reduced as far as the LC material will allow, reducing power consumption. However, an SRAM cell is formed from a relatively large number of transistors, which occupy a relatively large layout area. This restricts the maximum display resolution that can be achieved with this approach.

SUMMARY OF INVENTION

The prior art describes three types of pixel circuits: those with circuits to reduce leakage, such that new data may be written at a reduced rate; those which invert the data in the pixel, such that data need only be written when the displayed image is required to change; and those which store the data in SRAM and use the stored data to control the connection of external reference voltages, whereby the reference voltages alternate to implement inversion of the LC voltage.

Each of these approaches has disadvantages: pixel circuits which only reduce leakage must receive new, inverted data from the driver circuits at a rate dictated by the characteristics of the LC, therefore requiring relatively frequent charging of the column electrodes and increasing the power consumption of the display; pixel circuits which only invert the data in the pixel must perform the inversion at a relatively high frequency, such that the previous data has not been significantly degraded by leakage, also resulting in increased power consumption; SRAM pixels are large, and cannot be used in high resolution displays.

A device and method in accordance with the present invention provide a display utilising a pixel circuit that both minimises leakage of charge from the pixel and inverts the pixel data voltage internally. Such a display can be operated with the lowest possible power consumption, since the LC inversion rate may be reduced as far as the LC material will allow, the LC inversion may be performed without charging the column electrodes, and the driver circuits may be deactivated while the image is static. The device and method in accordance with the present invention enable the above functions using a minimum number of circuit elements.

According to a basic aspect of the invention, there is provided a display utilising a pixel circuit incorporating circuit elements for minimising the leakage of charge from the pixel, and additionally incorporating circuit elements for inverting the pixel voltage.

According to another aspect of the invention, there is provided a method of driving a display featuring such a pixel.

According to another aspect of the invention, some of the elements forming the circuit for minimising the leakage of charge also form part of the circuit for inverting the pixel voltage.

According to another aspect of the invention, one or more of the power supplies used to provide the function of minimising the leakage of charge from the pixel takes a different voltage level during part of the inversion operation.

According to one aspect of the invention, a pixel circuit having a video mode, a memory mode and an inversion mode of operation includes: a pixel storage node for storing data to be output by a display element; a pixel write circuit configured to receive display data and provide the display data to the pixel storage node for storage thereon; a hold circuit operatively coupled to the pixel write circuit and configured to minimize leakage of charge from the pixel storage node through the pixel write circuit; and an internal inversion circuit operatively coupled to the hold circuit and the pixel storage node and configured to invert a voltage of the data stored on the pixel storage node and a voltage applied to a display element that receives data stored on the pixel storage node.

According to one aspect of the invention, the pixel circuit includes the display element, the display element including a first end and a second end, the first end electrically connected to the pixel storage node, and the second end electrically connected to a first power source terminal.

According to one aspect of the invention, the pixel write circuit comprises an input node, an output node, and an intermediate node electrically connected between the input node and the output node, wherein the output node is electrically connected to the pixel storage node, and the hold circuit comprises a switching device configured to selectively couple the intermediate node to a second power source terminal, and wherein when the pixel circuit is operating in memory mode, the switching device is configured to maintain a voltage on the intermediate node at the same level as a voltage on the pixel storage node.

According to one aspect of the invention, wherein the pixel write circuit includes a first input transistor and a second input transistor each having a respective drain and source, and the hold circuit further comprises the first input transistor, wherein the drain of the first input transistor and the source of the second input transistor are electrically connected to each other to form the intermediate node, and wherein the drain of the second input transistor comprises the output node.

According to one aspect of the invention, the switching device includes a supply transistor having a source and drain, the drain of the supply transistor electrically connected to the second power source terminal, and the source of the supply transistor electrically connected to the intermediate node.

According to one aspect of the invention, the first input transistor and the supply transistor pass substantially the same current.

According to one aspect of the invention, the internal inversion circuit includes: the supply transistor; a cell storage node for storing data stored on the pixel storage node; an inversion transistor having a source and drain, wherein the source of the inversion transistor is electrically connected to the storage node, and the drain of the inversion transistor is electrically connected to the source of the supply transistor; and a pre-charge transistor including a source and drain, wherein the source of the pre-charge transistor is electrically connected to the pixel storage node, and a drain of the pre-charge transistor is electrically connected to the cell storage node to enable selective coupling of the cell storage node to the pixel storage node.

According to one aspect of the invention, the internal inversion circuit includes a pre-charge capacitor having a first end electrically connected to the drain of the pre-charge transistor.

According to one aspect of the invention, the first and second input transistors include respective gates electrically connected to a row select terminal, and the source of the first input transistor electrically connected to a column write terminal.

According to one aspect of the invention, the pre-charge transistor includes a gate electrically connected to a pre-charge terminal.

According to one aspect of the invention, the inversion transistor includes a gate electrically connected to an inversion enable terminal.

According to one aspect of the invention, the pixel circuit further includes a pixel storage capacitor having a first end electrically connected to the pixel storage node.

According to one aspect of the invention, the supply transistor includes a first supply transistor and a second supply transistor, the first supply transistor comprising an n-channel transistor and the second supply transistor comprising a p-channel transistor, and wherein a drain of the first supply transistor is electrically connected to the second power source terminal, a source of the first supply transistor is electrically connected to a source of the second supply transistor, and a drain of the second supply transistor is electrically connected to a fifth power source terminal.

According to one aspect of the invention, a display circuit includes a plurality of pixel circuits as set forth herein, the plurality of pixel circuits arranged in a row and column format.

According to one aspect of the invention, a display device includes: the display circuit as set forth herein; and a display device having a plurality of cells, each cell operatively coupled to a respective one of the plurality of pixel circuits.

According to one aspect of the invention, a method of driving a pixel circuit having a video mode, a memory mode and an inversion mode of operation, the pixel circuit including a pixel storage node for storing data to be output by a display element, a pixel write circuit configured to write data to the pixel storage node, a hold circuit operatively coupled to the pixel write circuit and configured to minimize charge leakage from the pixel storage node through the pixel write circuit, and an internal inversion circuit operatively coupled to the hold circuit and including a cell node for storing the data on the pixel storage node, the internal inversion circuit configured to invert a voltage of the data stored on the pixel storage node and a voltage applied to a display element that receives data stored on the pixel storage node, the method including: when the pixel circuit is in the inversion mode, isolating the cell node from pixel storage node; charging the pixel storage node to a high state; and selectively discharging the pixel storage node based on the data stored in the cell node such that the voltage on the pixel storage node is the logical compliment of the voltage stored on the cell node.

According to one aspect of the invention, the internal inversion circuit includes a pre-charge terminal operative to selectively couple the pixel data node to the cell node, wherein isolating the cell node includes driving the pre-charge terminal to a low state to isolate the cell node from pixel storage node.

According to one aspect of the invention, the pixel write circuit includes a column write terminal for receiving data and a row select terminal for enabling the data on the column write terminal to be transferred to the pixel storage node, and wherein charging the pixel storage node includes driving both the row select terminal and the column write terminal to a high state for a predetermined time period to charge the pixel cell node, and then driving at least the row select terminal to the low state.

According to one aspect of the invention, the hold circuit is coupled to a power terminal and configured to selectively provide a voltage from the power terminal to the pixel write circuit, and the inversion circuit is coupled to an invert terminal that is operative to invert the voltage on the pixel storage node and the display element, and selectively discharging includes driving the invert terminal to the high state and the power terminal to the low state after the row select and column write terminals are driven to the low state, and after a predetermined time period driving the invert terminal to the low state and the power terminal to the high state.

According to one aspect of the invention, the method further includes while in the memory mode of operation, driving the row select terminal and the invert terminal to the low state, and driving the voltage terminal and the pre-charge terminal to the high state.

According to one aspect of the invention, the voltage provided by the power terminal and the pre-charge voltage are selected such that a voltage on the pixel storage node after inversion corresponds to an LC black or white voltage.

According to one aspect of the invention, the voltage provided by the power terminal and the pre-charge voltage are selected such that a voltage on the pixel storage node after inversion is at least one of greater than the greater of the black or white voltages or less than the lesser of the black or white voltages.

According to one aspect of the invention, the cell node comprises a capacitor having one end connected to a fourth power source and the other end selectively coupled to the pixel storage node, the method comprising changing the voltage applied to the fourth power source before selectively discharging the pixel storage node.

According to one aspect of the invention, a method of driving a pixel circuit having a video mode, a memory mode and an inversion mode of operation, the pixel circuit including a pixel storage node for storing data to be output by a liquid crystal cell, a pixel write circuit including a column write terminal for receiving data and a row select terminal for enabling the data on the column write terminal to be transferred to the pixel storage node, a hold circuit operatively coupled to the pixel write circuit and configured to minimize leakage of charge from the pixel storage node through the pixel write circuit, the hold circuit comprising a first supply transistor and a second supply transistor, the first supply transistor comprising an n-channel transistor and the second supply transistor comprising a p-channel transistor, and wherein a drain of the first supply transistor is electrically connected to the second power source terminal, a source of the first supply transistor is electrically connected to a source of the second supply transistor, and a drain of the second supply transistor is electrically connected to a third power source terminal, and an internal inversion circuit operatively coupled to the hold circuit and comprising a cell node for storing the data on the pixel storage node, the internal inversion circuit configured to invert a voltage of the data stored on the pixel storage node and a voltage applied to a liquid crystal cell that receives data stored on the pixel storage node, the method including: when the pixel circuit is in the inversion mode, isolating the cell node from pixel storage node; charging the pixel storage node to a low state; and based on a voltage stored in the cell node, selectively connecting the pixel storage node to the fifth power source terminal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF REFERENCE NUMERALS

Figure 1:
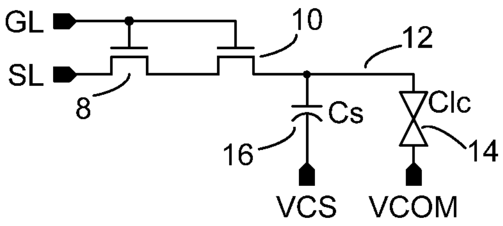
FIG. 1 is a schematic illustration of a pixel circuit from the conventional art

8 transistor
10 transistor
11 pixel write circuit
11*a* input node
11 output node
11*c* intermediate node
12 pixel storage node
14 liquid crystal cell
16 pixel storage node capacitor
22 matrix of picture elements (pixels)
24 data driver
26 scan driver
30 transistor
31 hold circuit
32 transistor
34 cell node capacitor
36 transistor
37 inversion circuit
54 transistor
56 transistor

DETAILED DESCRIPTION OF INVENTION

Figure 2:
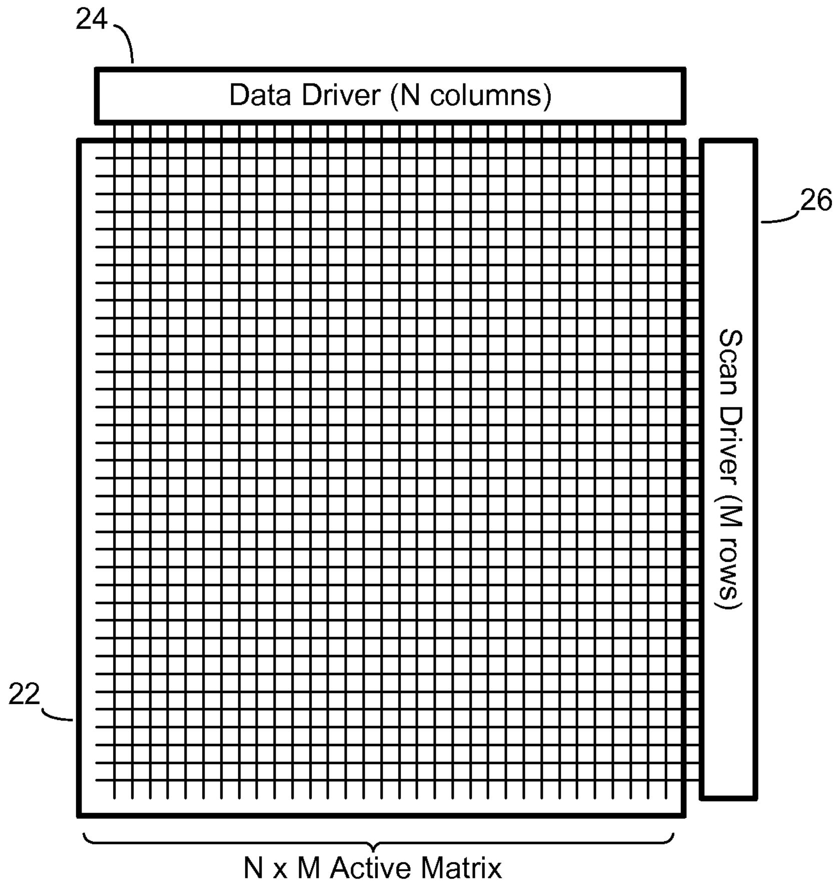
FIG. 2 is a schematic illustration of an active matrix display incorporating an exemplary pixel configuration in accordance with a first embodiment of the invention

A first embodiment of a display device in accordance with the present invention is shown in FIG. 2. A matrix 22 of picture elements (pixels) is arranged in M rows and N columns. Each pixel row is connected to a respective row electrode and each pixel column is connected to a respective column electrode, with the column electrodes being connected to the N outputs of a data driver 24 and the row electrodes being connected to the M outputs of a scan driver 26.

Figure 3:
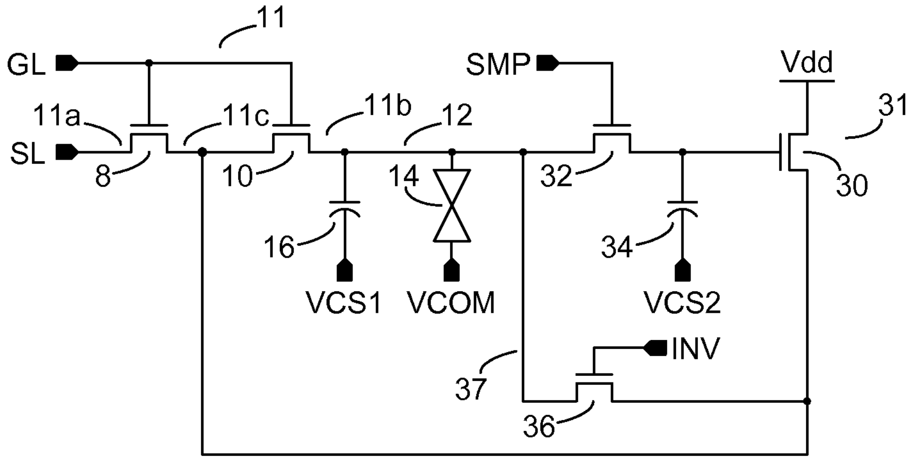
FIG. 3 is a schematic illustration of the pixel configuration illustrated in FIG. 2

A pixel circuit in accordance with the first embodiment is shown in FIG. 3. The circuit is composed of n-channel transistors 8, 10, 30, 32 and 36, capacitors 16 and 34 and a display element 14, such as a liquid crystal cell. The gates of transistors 8 and 10 (first and second input transistors, respectively) are connected to a GL input (row select terminal); the source of transistor 8 is connected to a SL input (column write terminal); the drain of transistor 8 is connected to the source of transistor 10, the drain of transistor 36 (inversion transistor) and the source of transistor 30 (supply transistor); the drain of transistor 10 is connected to the first electrode of capacitor 16 (pixel storage capacitor), the first electrode of the liquid crystal cell 14 and the sources of transistors 32 and 36; the gate of transistor 32 is connected to an SMP input (precharge terminal); the drain of transistor 32 (pre-charge transistor) is connected to the gate of transistor 30 and to the first electrode of capacitor 34 (cell storage capacitor); the gate of transistor 36 is connected to an INV input (invert terminal); the second electrode of the liquid crystal cell 14 is connected to a VCOM input (first power supply terminal); the drain of transistor 30 is connected to a Vdd input (second power supply terminal); the second electrode of the capacitor 16 is connected to a VCS1 input (third power supply terminal); and the second electrode of the capacitor 34 is connected to a VCS2 input (fourth power supply terminal). The VCOM input may be common to all pixels, and may be an electrode on the opposing substrate of the LCD. The VCS1 and VCS2 inputs may be connected to the VCS1 and VCS2 inputs respectively of all the pixels in the same row. The VCS1 and VCS2 inputs may be connected together.

Transistors 8 and 10 form an exemplary pixel write circuit 11 that is configured to receive data and to provide the data the pixel storage node and liquid crystal cell 14. The exemplary pixel write circuit 11 includes an input node 11*a*, and output node 11, and an intermediate node 11*c* arranged electrically between the input node and output node.

Transistors 8 and 30 form an exemplary hold circuit 31 configured to minimize charge leakage from the liquid crystal cell/pixel storage node 12 through the pixel write circuit 11. More particularly, and as discussed below, the transistor 30, which can function as a switching device, along with transistor 8 of the pixel write circuit 11 maintain a voltage on the intermediate node 11*c* at substantially the same level as a voltage on the pixel storage node 12. In this manner, leakage from the pixel storage node 12 through the pixel write circuit 11 is minimized.

Transistors 36, 32 and 30 form an inversion circuit 37 configured to invert a voltage on the liquid crystal cell 14 as well as a voltage of the data stored on the pixel storage node 12. Inversion of the voltage on the pixel storage cell and liquid crystal cell refers to a "logical" inversion (e.g., from a high state to a low state or from a low state to a high state). Operation of the inversion circuit 37 is described in more detail below.

As will be appreciated, a number of transistors in the circuit of FIG. 3 have dual roles, i.e., they are part of different functional circuits. For example, transistor 8 is not only part of the write circuit 11, but also part of the hold circuit 31. Similarly, while transistors 30, 32 and 36 form the core of the inversion circuit 37, all of the transistors in FIG. 3 may take at least some part in the inversion function. However, in other configurations transistors may not have dual roles. The device and method in accordance with the present invention includes embodiments in which transistors are dedicated to a particular function and embodiments in which transistors have multi-roles (e.g., a transistor is used in two or more different functional portions of the circuit)

Figure 4A:
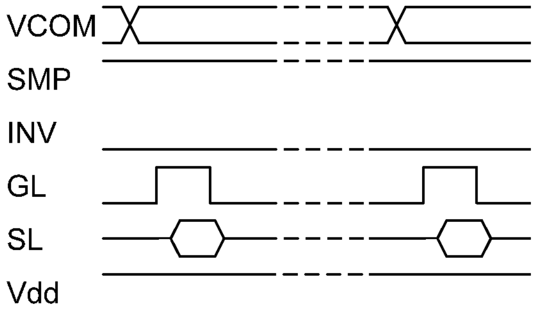
FIG. 4*a* is a timing diagram illustrating a method of operating the pixel of FIG. 3 during video mode.

The pixel has three modes of operation: video mode, where data is written from the driver at full frame rate (typically 60 Hz); memory mode, where the pixel maintains its data; and inversion mode, where the pixel inverts the stored data. In video mode, Vdd and SMP are held high, INV is held low, and other signals operate as for a conventional active matrix display. FIG. 4*a* illustrates a timing diagram for video mode operation.

In memory mode, Vdd and SMP are held high, INV is held low, VCOM, VCS1 and VCS2 retain their previous state, and the SL and GL inputs are held at substantially the same low level. Transistors 8 and 30 act to maintain the voltage on the drain of transistor 8 and the source of transistor 10 at a similar level to the voltage on the pixel storage node 12. Typically, a "similar level" is of the order of 100 mV, although this depends on the transistor performance, the voltage range etc. Transistor 10 therefore has a very low drain-source voltage, and leakage current from the pixel is minimized.

The only direct current path in the pixel is from Vdd to the SL input, via the conduction paths of transistors 8 and 30. Transistors 8 and 30 therefore pass substantially the same current. In this context, there are 3 paths leading into node 11*c*: through transistors 30, 8 and 10. The current through transistor 10 is the leakage from the pixel, which we are seeking to minimise. Typically this is about 100 times smaller than the current through transistor 30, although again, this depends on the performance of the circuit. If the transistors are sized identically, they will maintain substantially the same bias conditions to pass this current. The bias conditions depend on the pixel voltage (data). In some cases, the transistors have the same bias conditions, in others their gate-source voltage will vary by O(100 mV) while their drain-source voltages will be different by several volts. If the GL and SL inputs are held at substantially the same low voltage (ideally, they are at the same voltage—the only variation will occur because the GL and SL inputs are controlled by different circuits, so they may be at slightly different voltages instant by instant due to noise, etc.), the gate-source voltage of transistor 8 is substantially zero (ideally exactly zero, but in reality it will always be about zero, due to noise (as in the explanation just above); if the voltage on the pixel storage node 12 is exactly mid-way between the Vdd voltage and the voltage applied to the GL and SL inputs, both transistors 8 and 30 will have the same bias conditions (the same drain-source and gate-source voltages) if the source of transistor 30 is also exactly mid-way between the Vdd voltage and the voltage applied to the GL and SL inputs. In this case, the drain-source voltage of transistor 10 is zero, and no leakage current can flow from the pixel storage node 12.

In the case where the voltage on the pixel storage node 12 is greater than mid-way between the Vdd voltage and the voltage applied to the GL and SL inputs, transistors 8 and 30 will draw the same current if the source of transistor 30 is at a slightly lower voltage than the pixel storage node 12. In this case, the gate-source voltage of transistor 8 is substantially zero, while its drain-source voltage is more than half the difference between the Vdd voltage and the voltage applied to the GL and SL, and the transistor draws slightly more current than in the mid-voltage case. Transistor 30 preferably draws substantially the same current as transistor 8, but it has a lower drain-source voltage than transistor 8. This difference is compensated for by the slightly higher gate-source voltage of transistor 30. This is part of the explanation of the operation, rather than a definition of how to operate the circuit. The bias conditions for transistor 8 are fixed by the levels applied to the GL and SL inputs, and by the pixel voltage. Transistor 30 must (by Kirchoff's laws) supply the majority of this current (the rest is pixel leakage through transistor 10—about 100 times smaller), so its bias condition is forced. As it works out, this large difference in drain-source voltage can be compensated for by a small difference in gate-source voltage, so node 11*c* is held very close to the pixel voltage.

Conversely, in the case where the voltage on the pixel storage node 12 is lower than mid-way between the Vdd voltage and the voltage applied to the GL and SL inputs, transistors 8 and 30 will draw the same current if the source of transistor 30 is at a slightly higher voltage than the pixel storage node 12. As before, the gate-source voltage of transistor 8 is substantially zero, but its drain-source voltage is less than half the difference between the Vdd voltage and the voltage applied to the GL and SL, and the transistor draws slightly less current than in the mid-voltage case. Transistor 30 preferably draws substantially the same current as transistor 8, but it has a higher drain-source voltage than transistor 8. This difference is compensated for by the slightly lower (i.e. negative) gate-source voltage of transistor 30.

Since the current through a transistor is more strongly dependant on its gate-source voltage than its drain-source voltage, a large disparity between the drain-source voltages of transistors 8 and 30 can be compensated for by a small disparity in their gate-source voltages. Typically, a volt of drain-source voltage disparity may be compensated for by tens of millivolts of gate-source voltage disparity. The source voltage of transistor 30 therefore remains very close to the voltage on the pixel storage node 12 and leakage current through transistor 10 is minimised across a range of pixel voltages.

The display may be operated with alternating current or direct current VCOM drive.

Figure 4B:
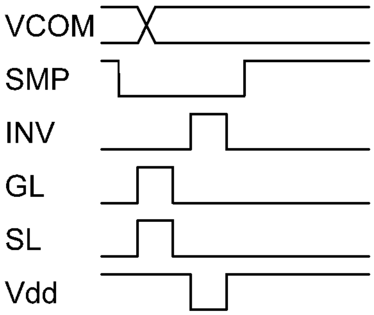
FIG. 4*b* is a timing diagram illustrating a method of operating the pixel of FIG. 3 during inversion mode.

The timing of the inversion operation is shown in FIG. 4*b*, and happens in two phases. First, a node of the pixel is precharged to a high level while the previous data is isolated and stored on a separate node (cell node); then the precharged node is selectively discharged, depending on the value of the stored data, either being discharged to a low level or being allowed to retain its precharge voltage. The voltages applied to the VCS1 and VCS2 pins do not change during the inversion operation.

To implement the precharge phase, SMP is switched to a low level, isolating the data voltage on the first electrode of capacitor 34. GL is then raised to a high level, turning on transistors 8 and 10, and SL is raised to a high level. GL is raised to a higher level than SL such that transistors 8 and 10 fully conduct the voltage on SL, charging the first electrodes of the first capacitor 16 and LC cell 14 to the voltage on the SL line. GL is then lowered to its previous low level, turning off transistors 8 and 10 and isolating the precharged node. During this phase, the voltage on the VCOM pin is inverted if ac VCOM drive is being used.

In the selective discharge phase, INV is raised to a high level, turning on transistor 36, and Vdd is switched to a low level. If the data stored on the first electrode of capacitor 34 is high, transistor 30 is switched on, and the first electrodes of the first capacitor 16 and LC cell 14 are discharged to the low level on Vdd via transistors 36 and 30. If the data stored on the first electrode of capacitor 34 is low, transistor 30 remains off, and the first electrodes of the first capacitor 16 and LC cell 14 retain the precharge voltage. In each case, the final voltage on the first electrodes of the first capacitor 16 and LC cell 14 is the logical complement of the data voltage stored on the first electrode of capacitor 34, and the data applied to the LC has been inverted.

The final stage of the operation is for the pixel to return to memory mode: after a predetermined time period, SMP and Vdd are raised to their original high levels, and INV is switched to its original low level. The charge stored on both capacitors and the LC cell is shared, giving a final voltage that is either slightly higher than the low level of Vdd, or slightly lower than the precharge voltage. The second capacitor 54 may be sized significantly smaller than the sum of the larger capacitor 16 and the LC capacitance 14 to minimise this change in voltage. The values of Vdd and the precharge voltage may be optimised such that the final pixel voltages are equal to the black and white voltages of the LC. Alternatively, the values of Vdd and the precharge voltage may be optimised such that the final pixel voltages correspond to a wider range of voltages, such that the higher pixel voltage is greater than the higher of the black and white LC voltages, and/or the lower pixel voltage is less than the lower of the black and white LC voltages.

An alternative driving scheme involves changing the voltage applied to the VCS2 input before the selective inversion phase. For example, if it is known that leakage increases the voltage on the pixel storage node during memory mode, the voltage on VCS2 may be reduced after SMP has been lowered such that transistor 30 is not switched on by a low voltage on the top plate of capacitor 34. The voltage applied to the VCS2 input may subsequently be returned to its usual value once the inversion operation has been completed.

Figure 5:
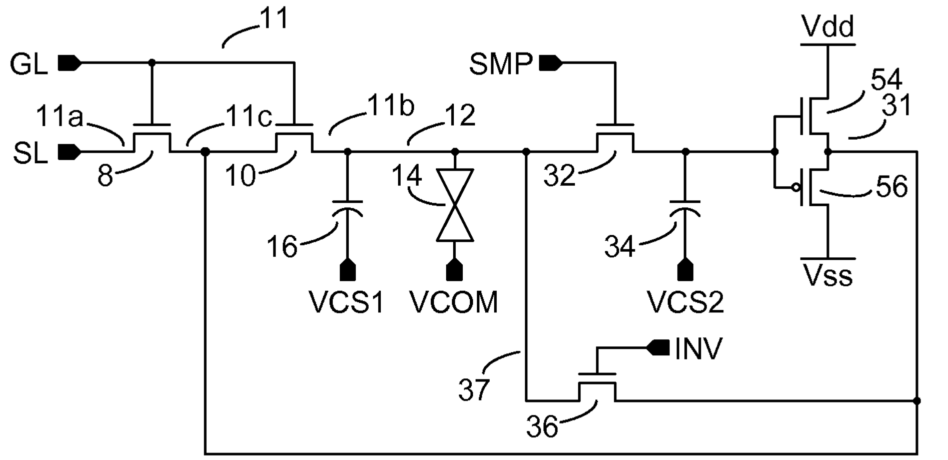
FIG. 5 is a schematic illustration of a pixel configuration in accordance with a second embodiment of the invention

A second embodiment is shown in FIG. 5. The circuit is the same as in the first embodiment, except that the transistor 30 has been replaced by an n-channel transistor 54 (first source transistor) and a p-channel transistor 56 (second source transistor), connected as follows: the drain of transistor 54 is connected to the Vdd input; the source of transistor 54 is connected to the source of transistor 56, to the drain of transistor 36 and to the drain of transistor 8 and the source of transistor 10; the drain of transistor 56 is connected to a Vss input (a fifth power source terminal); the gates of transistors 54 and 56 are connected together and to the first electrode of capacitor 34 and the drain of transistor 32.

In memory mode, all signals are as described for the first embodiment. In addition, the Vss input is connected to a low power supply. In this mode, transistors 54 and 56 operate as a unity-gain amplifier, copying the voltage on the pixel storage node 12 to the sources of transistors 54 and 56, minimising the drain-source voltage of transistor 10, as in the first embodiment.

The timing of the inversion operation is as described for the first embodiment: precharge is performed as before; in the inversion phase, Vdd is set low, as before, and transistor 54 is switched on when the voltage on the first electrode of capacitor 34 is high, discharging the first electrodes of the first capacitor 16 and LC cell 14, or remains off when the voltage on the first electrode of capacitor 54 is low, preventing discharge of the first electrodes of the first capacitor 16 and LC cell 14. Transistor 56 remains off at all times.

In addition, the circuit of the second embodiment could be used in a complementary manner to that described: rather than the pixel being precharged to a high voltage and Vdd input being set low during the inversion process, the pixel could be precharged low and the Vss input pulsed high during the inversion process. In this case, low data on the first electrode of capacitor 34 would cause transistor 56 to turn on and the first electrodes of the first capacitor 16 and LC cell 14 to be charged to the high level on the Vss input; high data on the first electrode of capacitor 34 would cause transistor 56 to remain switched off, and the first electrodes of the first capacitor 16 and LC cell 14 would retain their low precharge voltage.

Figure 6:
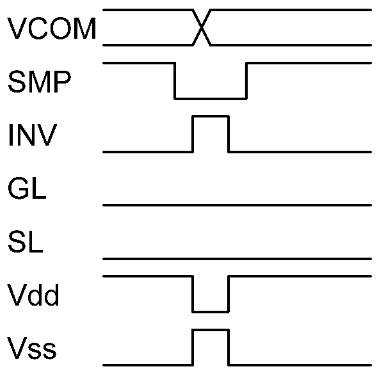
FIG. 6 is a timing diagram illustrating a method of operating the pixel of FIG. 5

A further method of performing the inversion operation using the pixel circuit of the second embodiment is illustrated in FIG. 6. There is no precharge phase, such that the GL and SL inputs do not change. The pixel storage node 12 therefore retains its stored voltage. SMP is set to a low level to isolate the top plate of capacitor 34. During the inversion phase, INV is set to a high level, and Vdd and Vss are set to low and high levels respectively, such that transistors 54 and 56 operate as a standard static inverter. In this case, low data on the first electrode of capacitor 34 would cause transistor 56 to turn on and transistor 54 to turn off, and the first electrodes of the first capacitor 16 and LC cell 14 to be charged to the high level on the Vss input; high data on the first electrode of capacitor 34 would cause transistor 54 to turn on and transistor 56 to turn off, and the first electrodes of the first capacitor 16 and LC cell 14 to be charged to the low level on the Vdd input. During this phase, the voltage on the VCOM pin is inverted if ac VCOM drive is being used.

Many variations on the above circuits will be apparent to one skilled in the art. Examples include: some or all of the transistors 10, 50 and 52 may be changed for double-gate transistors to reduce leakage (higher numbers of gates are also possible, but may have a detrimental effect on the time taken for data writing and/or inversion); the leakage reduction circuit transistors 8 and 30 may be changed for double-gate transistors (again, higher numbers of gates are possible, but may have a detrimental effect on operation); the n-channel transistors described may be replaced by p-channel transistors, and all signals inverted; the LC cell may be replaced by another voltage-driven optical layer such as organic light-emitting diode (OLED) or an electrophoretic or electrowetting element.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The present invention may be utilised to provide a low-power, high resolution display for use in portable and battery-powered devices. Such a display has the benefits of increasing the time the device may operate on one charge of its battery while still being able to show high-quality images.

What is claimed is:

1. A pixel circuit having a video mode, a memory mode and an inversion mode of operation, comprising:

a pixel storage node for storing data to be output by a display element;

a pixel write circuit configured to receive display data and provide the display data to the pixel storage node for storage thereon;

a hold circuit operatively coupled to the pixel write circuit and configured to minimize leakage of charge from the pixel storage node through the pixel write circuit; and an internal inversion circuit operatively coupled to the hold circuit and the pixel storage node and configured to invert a voltage of the data stored on the pixel storage node and a voltage applied to a display element that receives data stored on the pixel storage node, wherein the pixel write circuit comprises an input node, an output node, and an intermediate node electrically connected between the input node and the output node, wherein the output node is electrically connected to the pixel storage node, and the hold circuit comprises a switching device configured to selectively couple the intermediate node to a second power source terminal, wherein when the pixel circuit is operating in memory mode, the switching device is configured to maintain a voltage on the intermediate node at the same level as a voltage on the pixel storage node, wherein the switching device comprises a supply transistor having a source and drain, the drain of the supply transistor electrically connected to the second power source terminal, and the source of the supply transistor electrically connected to the intermediate node, and wherein the supply transistor comprises a first supply transistor and a second supply transistor, the first supply transistor comprising an n-channel transistor and the second supply transistor comprising a p-channel transistor, and wherein a drain of the first supply transistor is electrically connected to the second power source terminal, a source of the first supply transistor is electrically connected to a source of the second supply transistor, and a drain of the second supply transistor is electrically connected to a fifth power source terminal.

2. The pixel circuit according to claim 1, wherein the display element includes a first end and a second end, the first end electrically connected to the pixel storage node, and the second end electrically connected to a first power supply terminal.

3. The pixel circuit according to claim 1, wherein the pixel write circuit comprises a first input transistor and a second input transistor each having a respective drain and source, and the hold circuit further comprises the first input transistor, wherein the drain of the first input transistor and the source of the second input transistor are electrically connected to each other to form the intermediate node, and wherein the drain of the second input transistor comprises the output node.

4. The pixel circuit according to claim 1, wherein the first input transistor and the supply transistor pass substantially the same current.

5. The pixel circuit according to claim 1, wherein the internal inversion circuit comprises: the supply transistor;

a cell storage node for storing data stored on the pixel storage node;

an inversion transistor having a source and drain, wherein the source of the inversion transistor is electrically connected to the storage node, and the drain of the inversion transistor is electrically connected to the source of the supply transistor; and a pre-charge transistor including a source and drain, wherein the source of the pre-charge transistor is electrically connected to the pixel storage node, and a drain of the pre-charge transistor is electrically connected to the cell storage node to enable selective coupling of the cell storage node to the pixel storage node.

6. The pixel circuit according to claim 5, wherein the internal inversion circuit further comprising a pre-charge capacitor having a first end electrically connected to the drain of the pre-charge transistor.

7. The pixel circuit according to claim 5, wherein the first and second input transistors comprise respective gates electrically connected to a row select terminal, and the source of the first input transistor electrically connected to a column write terminal.

8. The pixel circuit according to claim 7, wherein the pre-charge transistor includes a gate electrically connected to a pre-charge terminal.

9. The pixel circuit according to claim 7, wherein the inversion transistor includes a gate electrically connected to an inversion enable terminal.

10. The pixel circuit according to claim 1, further comprising a pixel storage capacitor having a first end electrically connected to the pixel storage node.

11. A display circuit comprising a plurality of pixel circuits according to claim 1, the plurality of pixel circuits arranged in a row and column format.

12. A display device comprising:

the display circuit according to claim 11; and a display device having a plurality of cells, each cell operatively coupled to a respective one of the plurality of pixel circuits.

13. A method of driving a pixel circuit having a video mode, a memory mode and an inversion mode of operation, the pixel circuit including a pixel storage node for storing data to be output by a display element, a pixel write circuit configured to write data to the pixel storage node, a hold circuit operatively coupled to the pixel write circuit and configured to minimize charge leakage from the pixel storage node through the pixel write circuit, and an internal inversion circuit operatively coupled to the hold circuit and comprising a cell node for storing the data on the pixel storage node, the internal inversion circuit configured to invert a voltage of the data stored on the pixel storage node and a voltage applied to a display element that receives data stored on the pixel storage node, and the cell node comprising a capacitor having one end connected to a fourth power source and the other end selectively coupled to the pixel storage node, the method comprising:

when the pixel circuit is in the inversion mode, a) isolating the cell node from pixel storage node;

b) charging the pixel storage node to a high state;

c) selectively discharging the pixel storage node based on the data stored in the cell node so that the voltage on the pixel storage node is the logical compliment of the voltage stored on the cell node; and d) changing the voltage applied to the fourth power source before step c).

14. The method according to claim 13, wherein the internal inversion circuit includes a pre-charge terminal configured to selectively couple the pixel data node to the cell node, wherein isolating the cell node includes driving the pre-charge terminal to a low state to isolate the cell node from pixel storage node.

15. The method according to claim 14, wherein the pixel write circuit includes a column write terminal for receiving data and a row select terminal for enabling the data on the column write terminal to be transferred to the pixel storage node, and wherein charging the pixel storage node includes driving both the row select terminal and the column write terminal to a high state for a predetermined time period to charge the pixel cell node, and then driving at least the row select terminal to the low state.

16. The method according to claim 15, wherein the hold circuit is coupled to a power terminal and configured to selectively provide a voltage from the power terminal to the pixel write circuit, and the inversion circuit is coupled to an invert terminal that is operative to invert the voltage on the pixel storage node and the display element, and wherein selectively discharging includes driving the invert terminal to the high state and the power terminal to the low state after the row select and column write terminals are driven to the low state, and after a predetermined time period driving the invert terminal to the low state and the power terminal to the high state.

17. The method according to claim 16, further comprising while in the memory mode of operation, driving the row select terminal and the invert terminal to the low state, and driving the voltage terminal and the pre-charge terminal to the high state.

18. The method according to claim 17, wherein the voltage provided by the power terminal and the pre-charge voltage are selected so that a voltage on the pixel storage node after inversion corresponds to an LC black or white voltage.

19. The method according to claim 17, wherein the voltage provided by the power terminal and the pre-charge voltage are selected so that at least one of a voltage on the pixel storage node after inversion is greater than the greater of the black voltage or white voltage, or the voltage on the pixel storage node after inversion is less than the lesser of the black voltage or white voltages.

20. A method of driving a pixel circuit having a video mode, a memory mode and an inversion mode of operation, the pixel circuit including a pixel storage node for storing data to be output by a liquid crystal cell, a pixel write circuit including a column write terminal for receiving data and a row select terminal for enabling the data on the column write terminal to be transferred to the pixel storage node, a hold circuit operatively coupled to the pixel write circuit and configured to minimize leakage of charge from the pixel storage node through the pixel write circuit, the hold circuit comprising a first supply transistor and a second supply transistor, the first supply transistor comprising an n-channel transistor and the second supply transistor comprising a p-channel transistor, and wherein a drain of the first supply transistor is electrically connected to the second power source terminal, a source of the first supply transistor is electrically connected to a source of the second supply transistor, and a drain of the second supply transistor is electrically connected to a third power source terminal, and an internal inversion circuit operatively coupled to the hold circuit and comprising a cell node for storing the data on the pixel storage node, the internal inversion circuit configured to invert a voltage of the data stored on the pixel storage node and a voltage applied to a liquid crystal cell that receives data stored on the pixel storage node, the method comprising:

when the pixel circuit is in the inversion mode, a) isolating the cell node from pixel storage node;

b) charging the pixel storage node to a low state; and c) based on a voltage stored in the cell node, selectively connecting the pixel storage node to the fifth power source terminal.

* * * * *